(12) United States Patent
Kim et al.

(10) Patent No.: US 8,743,304 B2
(45) Date of Patent: Jun. 3, 2014

(54) PIXEL ARRAY LAYOUT OF A LIQUID CRYSTAL DISPLAY

(75) Inventors: Yoon-Jang Kim, Suwon-si (KR);
Yeong-Keun Kwon, Suwon-si (KR);
Soon-Il Ahn, Cheonan-si (KR);
Kyung-Ho Park, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 267 days.

(21) Appl. No.: 12/435,533

(22) Filed: May 5, 2009

(65) Prior Publication Data
US 2010/0118221 A1 May 13, 2010

(30) Foreign Application Priority Data
Nov. 13, 2008 (KR) .................. 10-2008-0112843

(51) Int. Cl.
*G02F 1/1343* (2006.01)
*G02F 1/136* (2006.01)

(52) U.S. Cl.
USPC .................. 349/38; 349/39; 349/48

(58) Field of Classification Search
USPC ........... 349/48, 42–43, 38–39; 345/87, 90, 92
See application file for complete search history.

(56) References Cited

U.S. PATENT DOCUMENTS

| | | | | |
|---|---|---|---|---|
| 5,159,476 A * | 10/1992 | Hayashi | ........................... | 349/39 |
| 5,457,553 A * | 10/1995 | Mori | ............................. | 349/39 |
| 7,561,235 B2 * | 7/2009 | Ono | .............................. | 349/141 |
| 2005/0057461 A1 * | 3/2005 | Suh et al. | ........................ | 345/76 |
| 2005/0105036 A1 * | 5/2005 | Murakami | ...................... | 349/150 |
| 2006/0197882 A1 * | 9/2006 | Oh et al. | ........................... | 349/43 |
| 2007/0103631 A1 * | 5/2007 | Moon et al. | ..................... | 349/139 |
| 2007/0242206 A1 * | 10/2007 | Yoon | .............................. | 349/141 |
| 2008/0068524 A1 * | 3/2008 | Kim | ................................ | 349/38 |
| 2008/0117348 A1 * | 5/2008 | Chen | ............................... | 349/46 |
| 2009/0231312 A1 * | 9/2009 | Fujikawa | ..................... | 345/206 |

FOREIGN PATENT DOCUMENTS

| | | |
|---|---|---|
| JP | 02176725 A | 7/1990 |
| JP | 05173188 A | 7/1993 |
| JP | 2007-213056 | 8/2007 |
| JP | 2008116964 A | 5/2008 |
| KR | 1020060119399 | 11/2006 |
| KR | 1020080028079 | 3/2008 |

OTHER PUBLICATIONS

European Search Report for application No. 09004627.7-2205 dated Oct. 22, 2009.
European Patent Office—OA—Communication pursuant to Article 94(3) EPC. European Patent Application No. 09 004 627.7 dated Apr. 3, 2013.

* cited by examiner

*Primary Examiner* — Bumsuk Won
*Assistant Examiner* — Charles Chang
(74) *Attorney, Agent, or Firm* — Cantor Colburn LLP

(57) ABSTRACT

A liquid crystal display includes a substrate including a longer first side and a shorter second side, a plurality of gate lines disposed on the substrate, a plurality of data lines disposed on the substrate perpendicular to and insulated from the gate lines, and a plurality of pixel electrodes, each pixel electrode electrically connected to a data line by a switching element, wherein a number of the gate lines is about half of a number of the pixel electrodes, and the data lines extend in a direction which is substantially parallel to a direction of the first side.

23 Claims, 6 Drawing Sheets

PIXEL ARRAY LAYOUT OF A LIQUID CRYSTAL DISPLAY

This application claims priority to Korean Patent Application No. 10-2008-0112843, filed on Nov. 13, 2008, and all the benefits accruing therefrom under 35 U.S.C. §119, the contents of which in its entirety are herein incorporated by reference.

BACKGROUND OF THE INVENTION (a) Field of the Invention

This disclosure relates to a pixel array layout of a liquid crystal display.

(b) Description of the Related Art

A data driver for a liquid crystal display ("LCD") is more expensive than a LCD gate driver, and it can be difficult to integrate a data driver on a glass substrate using an amorphous silicon ("a-Si") thin film transistor ("TFT") and provide a data driver having high mobility. In addition, a cost of a data driver can exponentially increase according to the number of channels in an LCD. Therefore it would be desirable to decrease the number of data driver and/or the number of gate driver channels to reduce manufacturing cost.

FIG. 1 is a schematic plan view of a prior art LCD. FIG. 2A is a plan view of the LCD of FIG. 1 showing a pixel array layout, and FIG. 2b is an equivalent circuit diagram of the pixel array layout of FIG. 2A.

As shown in FIGS. 1, 2a, and 2b, the prior art LCD includes a plurality of gate lines Gi, including a first to a fourth gate lines $G_n$ to $G_{n+3}$, and a plurality of data lines Di, including a first to a fourth data lines $D_n$ to $D_{n+3}$ a pixel electrode 11, a storage electrode 12, a TFT 13, a data driver 14, and a gate driver 15.

This configuration decreases the number of data driver channels by one third compared to a commercially available pixel array layout wherein the data line is a column line, which extends in a column direction, by using the data line Di as row line and removing gate driver integrated circuits ("IC"s) by directly integrating the gate driver 15 on a glass substrate, in a pixel array manufacturing process, to reduce manufacturing cost.

As shown in FIGS. 2a and 2b, two data lines, the first and the second data lines $D_n$ and $D_{n+1}$ are disposed in one row pixel stripe 16, and one gate line, the first gate line $G_n$, is disposed in one column pixel stripe 17. The gate lines Gi are electrically connected in pairs and TFTs 13 are disposed in a zigzag fashion and are electrically connected to a corresponding data line Di and gate line Gi. Therefore, a data signal can be simultaneously applied to two pixel electrodes in two corresponding column pixel stripes and sufficient pixel charging time can be provided.

In the addition, to prevent a texture, which can be caused by a gate field and which may cause distortion, the storage electrode 12 can be disposed in close proximity to the gate line Gi.

In this configuration, however, because the gate line Gi is disposed in every column pixel stripe 17, and storage electrode 12 is disposed in close proximity to the gate line Gi, the aperture ratio is reduced. Furthermore, since two gate lines are electrically connected to one output terminal of the gate driver 15, a load of a gate line Gi can be relatively high so that a size of gate driver 15 may be increased. Therefore, a glass substrate use efficiency and a panel design margin can be reduced.

BRIEF SUMMARY OF THE INVENTION

The above described and other drawbacks are alleviated by a liquid crystal display wherein the number of gate lines is approximately halved.

In an embodiment, two pixel electrodes are disposed between substantially every two neighboring gate lines and thin film transistors are arranged in a zigzag fashion wherein at least one thin film transistor is centered on a gate line and electrically connects two pixel electrodes with two data lines, and a single gate turn on signal is used in every row pixel stripe.

Disclosed herein is a liquid crystal display including a substrate including a longer first side and a shorter second side; a plurality of gate lines disposed on the substrate; a plurality of data lines disposed on the substrate perpendicular to and insulated from the gate lines; and a plurality of pixel electrodes, each pixel electrode electrically connected to a data line by a switching element, wherein a number of the gate lines is about half of a number of the pixel electrodes, and the data lines extend in a direction which is substantially parallel to a direction of the first side.

Also disclosed is a liquid crystal display, including a substrate including a longer first side and a shorter second side; a plurality of gate lines disposed on the substrate; a plurality of data lines disposed on the substrate perpendicular to and insulated from the gate lines; and a plurality of pixel electrodes, each pixel electrode electrically connected to a data line by a switching element, wherein the data lines extend in a direction which is substantially parallel to a direction of the first side, and two pixel electrodes are disposed between substantially every two neighboring gate lines.

Also disclosed is a method of manufacturing a liquid crystal display, the method comprising forming a substrate having a longer first side and a shorter second side; disposing a plurality of gate lines on the substrate; disposing a plurality of data lines on the substrate perpendicular to and insulated from the gate lines; and electrically connecting each of a plurality of pixel electrodes to a data line by a switching element, wherein a number of the gate lines is about half of a number of the pixel electrodes, and the data lines extend in a direction which is substantially parallel to a direction of the first side.

These and other features, aspects, and advantages of the disclosed embodiments will become better understood with reference to the following description and appended claims.

BRIEF DESCRIPTION OF THE DRAWINGS

The disclosed subject matter is particularly pointed out and distinctly claimed in the claims at the conclusion of the specification. The foregoing and other objects, features, and advantages of the disclosed embodiments are apparent from the following detailed description taken in conjunction with the accompanying drawings in which:

Figure 1:
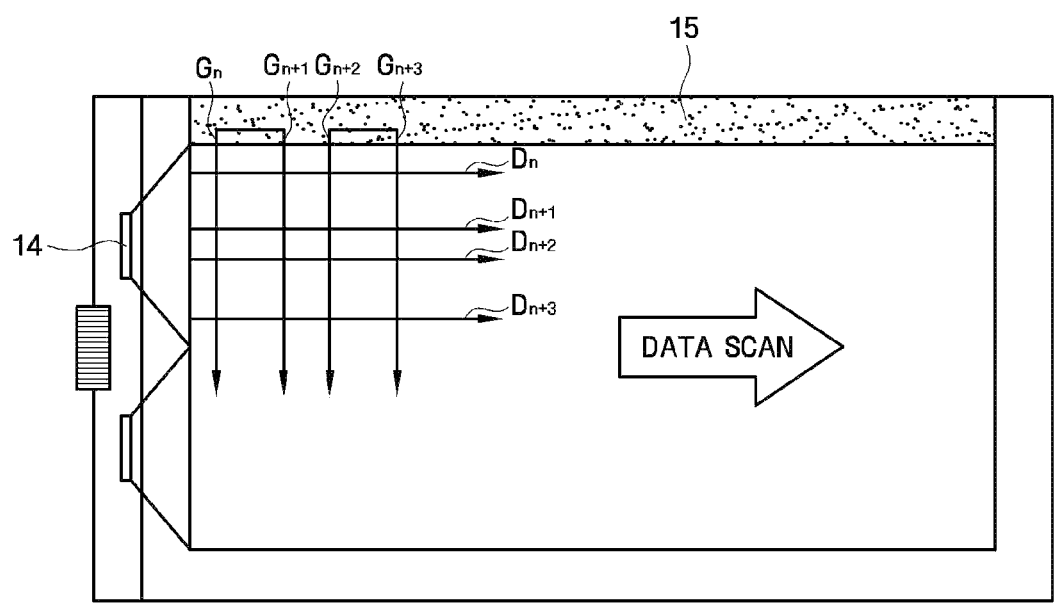
FIG. 1 is a schematic plan view of a prior art LCD.

The detailed description explains the disclosed embodiments, together with advantages and features, by way of example with reference to the drawings.

DETAILED DESCRIPTION OF THE INVENTION

Aspects, advantages and features of the present invention and methods of accomplishing the same may be understood more readily by reference to the following detailed description of preferred embodiments and the accompanying drawings. The present invention may, however, may be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "below", "lower", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings. However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

Figure 3:
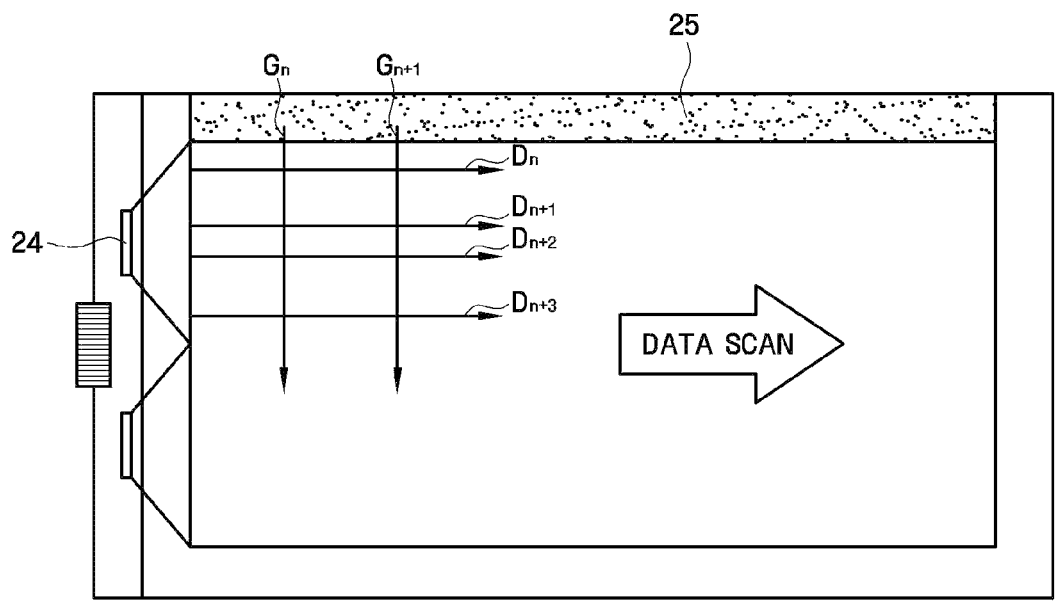
FIG. 3 is a plan view showing an exemplary embodiment of an LCD.
Figure 4A:
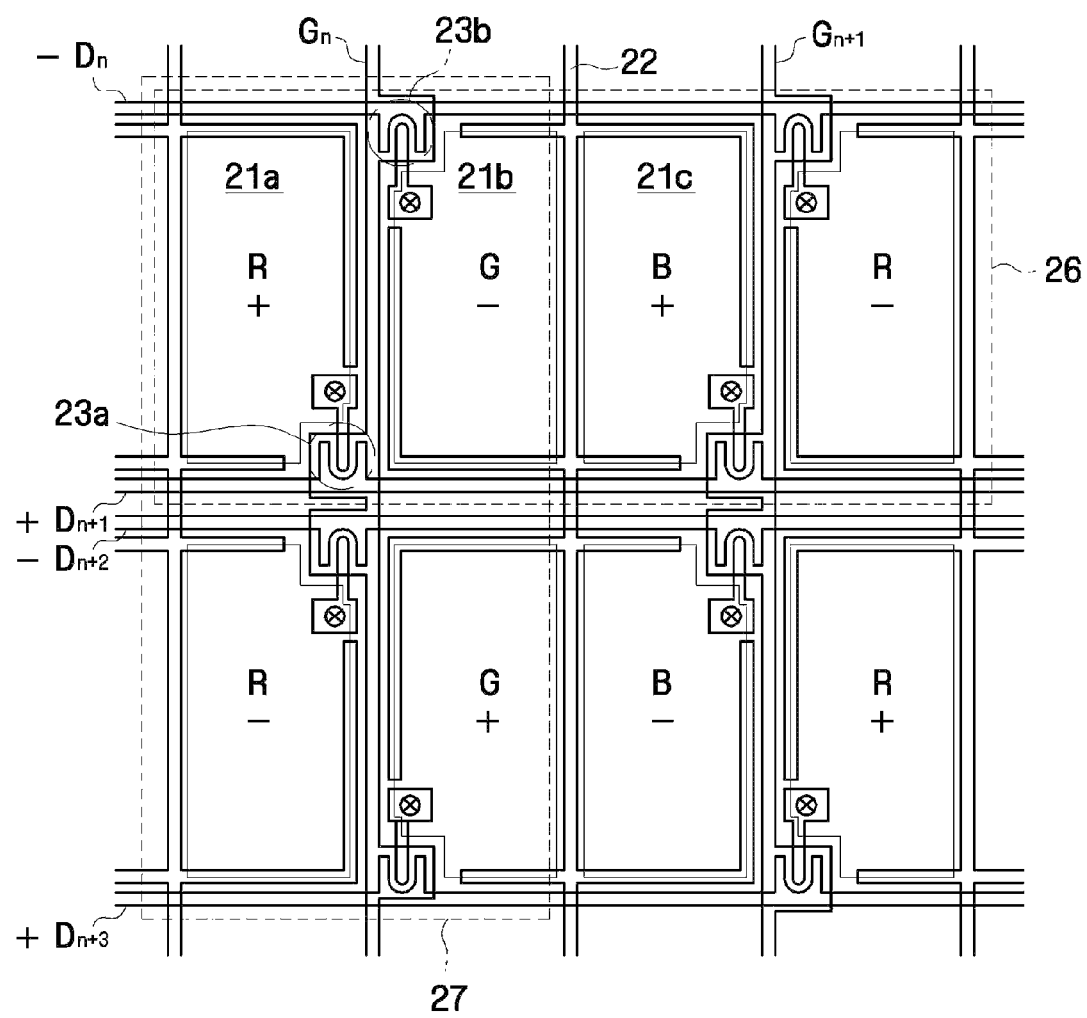
FIG. 4A is a plan view showing an exemplary embodiment of a pixel array layout of the LCD in FIG. 3.

FIG. 3 is a plan view showing an exemplary embodiment of an LCD. FIG. 4A is a plan view showing an exemplary embodiment of a pixel array layout of the LCD in FIG. 3, and FIG. 4B is an equivalent circuit diagram of an exemplary embodiment of the pixel array in FIG. 4A.

Figure 4B:
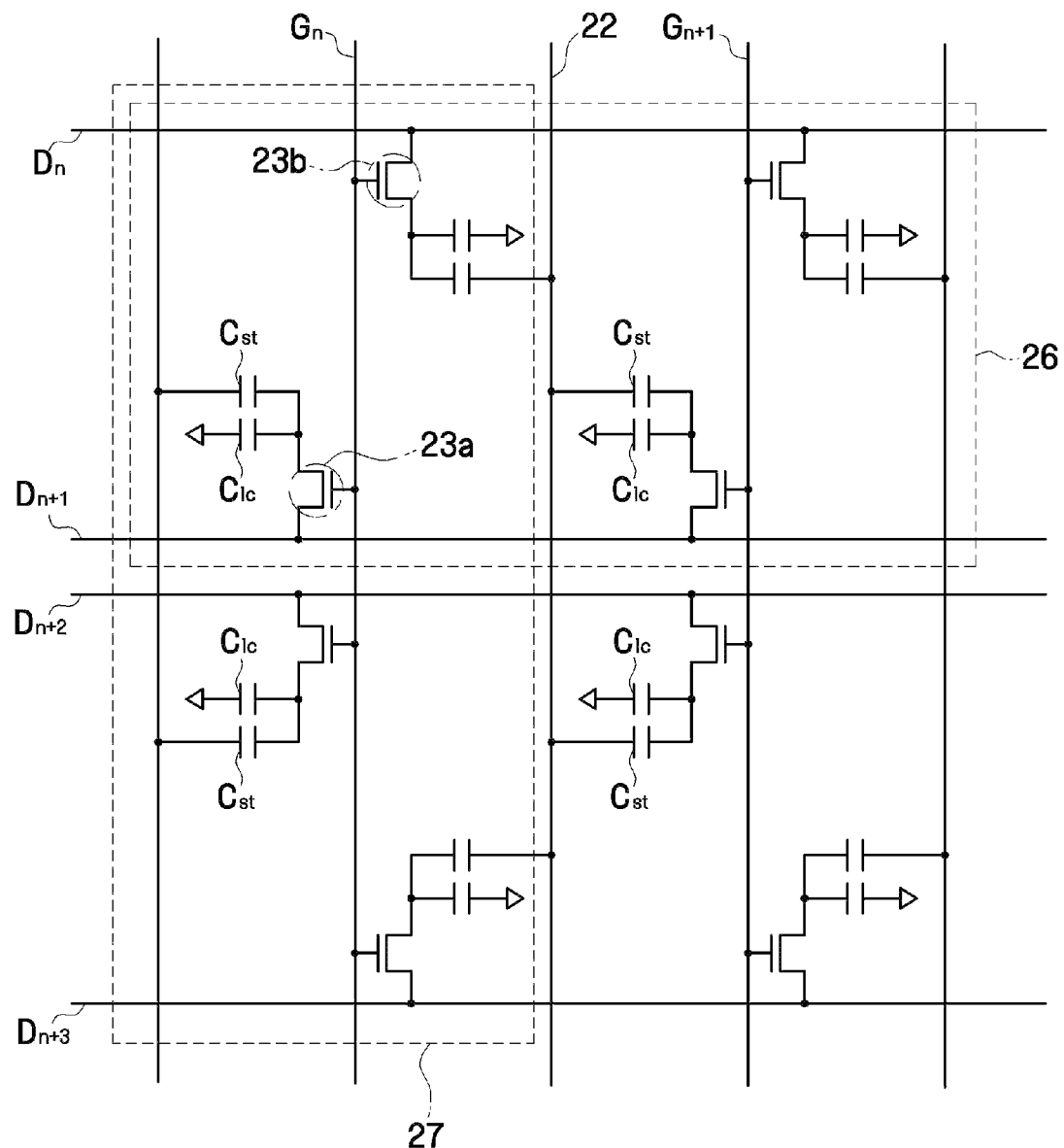
FIG. 4B is an equivalent circuit diagram of an exemplary embodiment of the pixel array layout in FIG. 4A.

As shown in FIGS. 3, 4A, and 4B, a plurality of data lines Di, which comprises the first to the fourth data lines $D_n$ to $D_{n+3}$ are disposed as row lines extending in a row direction, and a plurality of gate lines Gi, which comprise the first to the fourth gate lines $G_n$ to $G_{n+1}$, are disposed as column lines extending in a column direction. In an embodiment, a data driver 24 is disposed on a lateral side of a substrate and a gate driver 25 is disposed on an upper side of the substrate. In another embodiment, a data driver 24 is disposed on the upper side of a substrate and the gate driver 25 is disposed on the lateral side of the substrate. Thus, the location of the data driver 24 and the gate driver 25 is not limited.

In an information technologies ("IT") LCD panel or a television ("TV") LCD panel, the number of column lines can be greater than the number of row lines. In addition, a data driver for a LCD can be more expensive than a gate driver and a cost of a data driver can exponentially increase according to a number of channels. Therefore, it can be desirable for the data line Di to be a row line and extend in a row direction, rather than a column line extending in a column direction, to reduce a manufacturing cost.

Because the number of gate lines Gi can be increased if the gate line Gi is used as a column line, a pixel charging time can be reduced. For example, in an embodiment where a data line is a row line and a gate line is a column line in a high resolution LCD, such as a WXGA+ (comprising 1440×900 pixels and operating at 75 Hz, for example) wherein a fast driving technology is applied, the real pixel charging time is about 2 microseconds (μs). As a result, it can be difficult to drive a LCD panel uniformly and stably with a-Si TFT because a mobility of an a-Si TFT is relatively low.

Therefore, in order to obtain sufficient pixel charging time, as shown in FIGS. 4A, and 4B, two data lines, such as the first and the second data lines $D_n$ and $D_{n+1}$, are disposed in a row pixel stripe 26 and the first gate line $G_n$ is disposed in one column pixel stripe 27. Two pixel electrodes, such as the first and the second pixel electrodes 21b and 21a, are alternately connected to an odd and an even data line, such as the first and the second data lines $D_n$ and $D_{n+1}$, by two TFTs, such as the first and the second TFTs 23b and 23a, respectively, and the two TFTs, such as the first and the second TFTs 23b and 23a are simultaneously turned on by a single gate line, such as the first gate line $G_n$, disposed in the row pixel stripe 26. Thus, two data signals can be applied to two pixel electrodes, such as the first and the second pixel electrodes 21b and 21a, which are disposed adjacently in a row direction, through two data lines, such as the first and the second data lines $D_n$ and $D_{n+1}$, at the same time. Accordingly, a pixel charging time can be doubled using this configuration.

In addition, for dot inversion driving, the polarity of the data signals applied to the data lines, such as the first to the fourth data lines $D_n$, $D_{n+1}$, $D_{n+2}$, and $D_{n+3}$, for example, can be changed alternately according to a column direction.

Figure 2A:
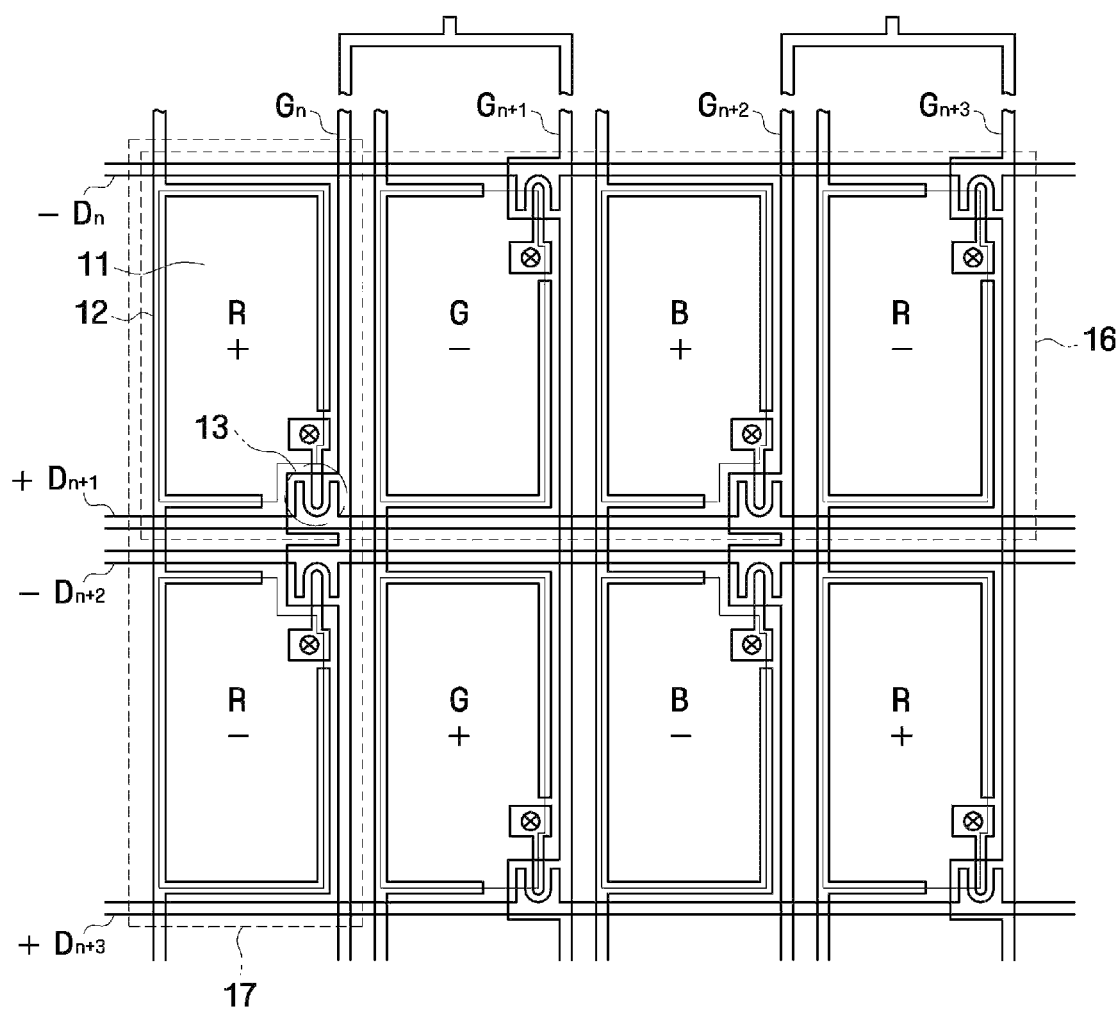
FIG. 2A is a plan view showing a pixel array layout of the LCD in FIG. 1.
Figure 2B:
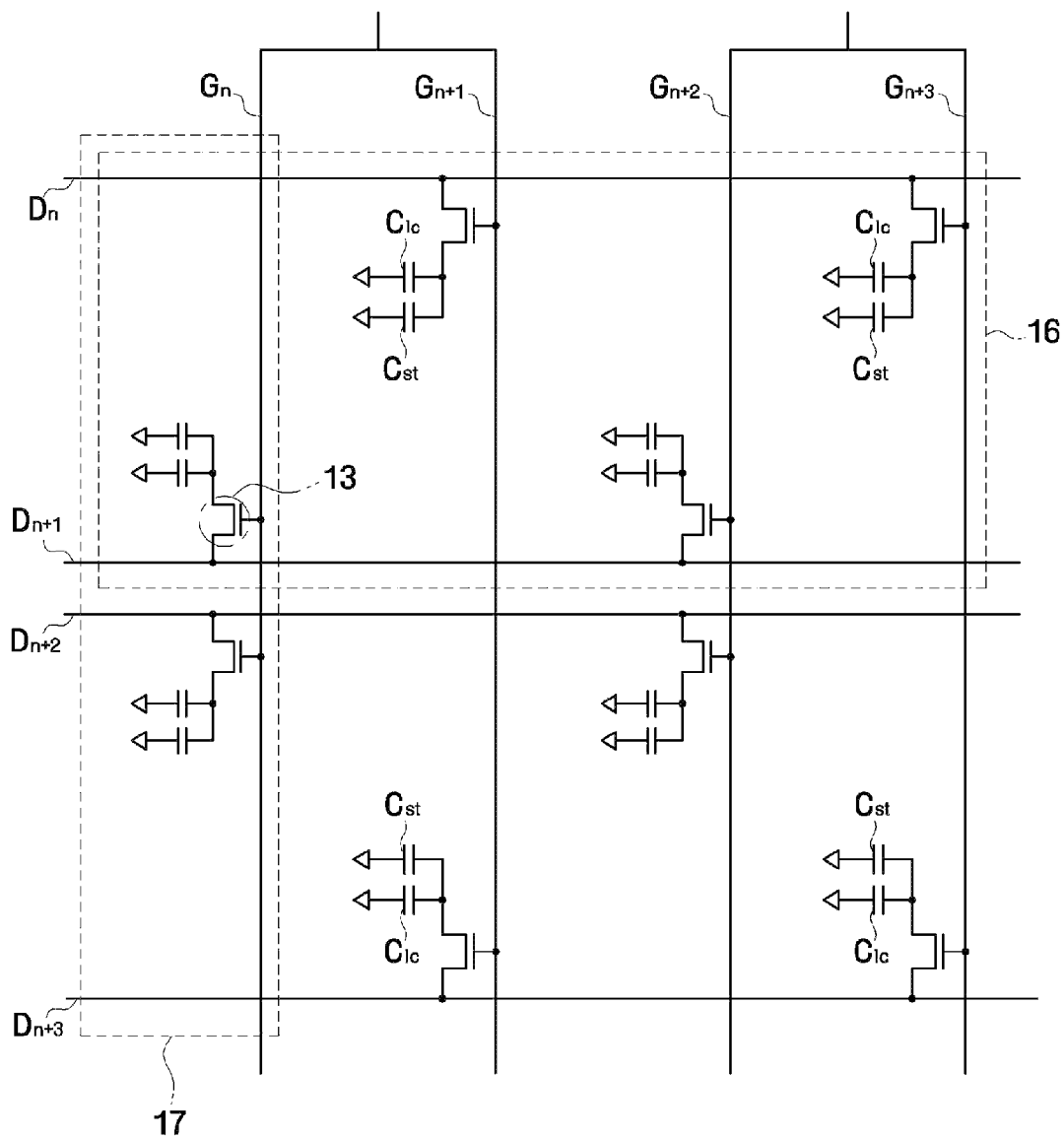
FIG. 2B is an equivalent circuit diagram of the pixel array layout in FIG. 2A.

In an embodiment, a number of the gate lines can be about half of a number of the gate lines in a prior art LCD, as illustrated in FIGS. 1, 2a, and 2b, even though a number of the data lines can be the same. Therefore an aperture ratio can be increased.

Furthermore, a load of a gate line connected to an output terminal of the gate driver may be reduced compared to the prior art LCD illustrated in FIGS. 1, 2a, and 2b because the number of the gate lines per output terminal of the gate driver can be reduced. Thus, in an embodiment, a channel dimension of a gate driver's output TFT can be reduced when using an amorphous silicon gate driver ("ASG") technology, which directly integrates the gate driver on a glass substrate. Thus, it has been observed that the total size of gate driver circuit 25 can be reduced. Therefore a glass use efficiency can be improved.

In addition, a storage electrode 22 can be disposed adjacent to an edge of a pixel electrode edge and between two gate lines, such as the first and the second gate lines $G_n$ and $G_{n+1}$. A part of the storage electrode 22 disposed between two neighboring pixel electrodes, such as the first pixel electrode 21b and a third pixel electrode 21c, may be overlapped with the neighboring pixel electrodes, such as the first and the third pixel electrodes 21b and 21c, or the storage electrode 22 disposed between two neighboring pixel electrodes, such as the first and the third pixel electrodes 21b and 21c, may not be overlapped with the neighboring pixel electrodes, such as the first and the third pixel electrodes 21b and 21c.

The disclosed pixel array can comprise a line width which is greater than a line width of a commercially available pixel array, and an increased line width of the storage electrode 22 can provide several benefits.

First, a coupling capacitance between two neighboring pixel electrodes, such as the first and the third pixel electrodes 21b and 21c can be reduced.

Second, a size of a light shielding element located on an opposite substrate (not shown) can be reduced by shielding light emitted from a backlight module, increasing an aperture ratio of the LCD.

Third, the disclosed LCD is compatible with liquid crystals having a fast response characteristic because a load of the storage electrode 22 can be reduced and a ratio of a capacitance of a storage capacitor to a capacitance of a liquid crystal capacitor ("Cst/Clc") can be maintained at a larger value.

As stated above, the disclosed LCD has many advantages, such as high aperture ratio, high glass use efficiency, low manufacturing cost, and good compatibility with a liquid crystal having a fast response characteristic.

Various other modifications (such as variable pixel electrode structure, and variable driving mode, for example) different from the above disclosed embodiment will be apparent and can be readily made by those skilled in the art without departing from the scope and spirit of this invention. Accordingly, it is not intended that the scope of this disclosure be limited to the description as set forth herein.

What is claimed is:

1. A liquid crystal display comprising:
a substrate having a longer first side and a shorter second side;
a plurality of gate lines disposed on the substrate;
a plurality of data lines disposed on the substrate perpendicular to and insulated from the gate lines;
a plurality of pixel electrodes, each pixel electrode electrically connected to a data line by a switching element; and
a plurality of storage electrodes, wherein the storage electrodes are disposed alternately with the gate lines,
wherein the data lines extend in a direction which is substantially parallel to a direction of the first side, the gate lines extend in a direction substantially perpendicular to the direction of the first side, a number of the gate lines is about half of a number of pixel electrodes in a row of the pixel electrodes extending in the data lines extension direction, and neighboring pixel electrodes in the gate lines extension direction are connected to respective neighboring data lines.

2. The liquid crystal display of claim 1, wherein two pixel electrodes are disposed between substantially every two neighboring gate lines.

3. The liquid crystal display of claim 2, further comprising a plurality of thin film transistors, wherein the thin film transistors are disposed in a zigzag fashion and wherein at least one thin film transistor is centered on a gate line.

4. The liquid crystal display of claim 1, wherein the first side is an upper side and the second side is a lateral side, and the data line is a row line.

5. The liquid crystal display of claim 1, wherein the first side is a lateral side and the second side is an upper side, and the data line is a column line.

6. The liquid crystal display of claim 1, wherein a number of the data lines is about twice the number of the pixel electrodes in a column extending in the gate lines extension direction.

7. The liquid crystal display of claim 1, further comprising a plurality of thin film transistors, wherein the thin film transistors are disposed in a zigzag fashion and wherein at least one thin film transistor is centered on a gate line.

8. The liquid crystal display of claim 1, wherein each of the storage electrodes are disposed substantially adjacent to an edge of a pixel electrode edge of the each pixel electrode and between two gate lines.

9. The liquid crystal display of claim 1, wherein a pair of pixel electrodes are adjacent to two data lines,
wherein a shape of one of the pair of pixel electrode and a shape of the other of the pixel electrode are symmetric to the two data lines.

10. The liquid crystal display of claim 1, wherein the polarity of data signals applied to the data lines is changed alternately according to a column direction.

11. The liquid crystal display of claim 1, wherein the polarity of data signals applied to each of a pair of pixel electrodes, which are adjacent to each other in a row direction or a column direction, is different.

12. The liquid crystal display of claim 1, wherein a first switching element is electrically connected to a first data line, a second switching element is electrically connected to a second data line, a third switching element is electrically connected to a third data line, a fourth switching element is electrically connected to a fourth data line, and
wherein the second switching element and the third element are in a first column region, and the first switching element and the fourth element are in a second column region.

13. A liquid crystal display, comprising:
a substrate comprising a longer first side and a shorter second side;
a plurality of gate lines disposed on the substrate;
a plurality of data lines disposed on the substrate perpendicular to and insulated from the gate lines;
a plurality of pixel electrodes, each pixel electrode electrically connected to a data line by a switching element; and
a plurality of storage electrodes, wherein the storage electrodes are disposed alternately with the gate lines,
wherein the data lines extend in a first direction which is substantially parallel to a direction of the longer first side, the gate lines extend in a direction substantially perpendicular to the direction of the first side, and neighboring pixel electrodes in the gate lines extension direction are connected to respective neighboring data lines, and
two pixel electrodes extending in the data lines extension direction are disposed between substantially every two neighboring gate lines.

14. The liquid crystal display of claim 13, wherein a number of the data lines is about twice a number of the pixel electrodes in a column extending in the gate lines extension direction.

15. The liquid crystal display of claim 13, further comprising a plurality of thin film transistors, wherein the thin film transistors are disposed in a zigzag fashion, and wherein at least one thin film transistor is centered on a gate line.

16. The liquid crystal display of claim 13, wherein a number of the gate lines is about half of a number of the pixel electrodes in a row of the pixel electrodes extending in the data lines extension direction.

17. The liquid crystal display of claim 13, wherein each of the storage electrodes are disposed substantially adjacent to an edge of a pixel electrode edge of the each pixel electrode and between two gate lines.

18. The liquid crystal display of claim 13, wherein a pair of pixel electrodes are adjacent to two data lines,
wherein a shape of one of the pair of pixel electrode and a shape of the other of the pixel electrode are symmetric to the two data lines.

19. The liquid crystal display of claim 13, wherein the polarity of data signals applied to the data lines is changed alternately according to a column direction.

20. The liquid crystal display of claim 13, wherein the polarity of data signals applied to each of a pair of pixel electrodes, which are adjacent to each other in a row direction or a column direction, is different.

21. The liquid crystal display of claim 13, wherein a first switching element is electrically connected to a first data line, a second switching element is electrically connected to a second data line, a third switching element is electrically connected to a third data line, a fourth switching element is electrically connected to a fourth data line, and
wherein the second switching element and the third element are in a first column region, and the first switching element and the fourth element are in a second column region.

22. A method of manufacturing a liquid crystal display, the method comprising:
forming a substrate having a longer first side and a shorter second side;
disposing a plurality of gate lines on the substrate;
disposing a plurality of data lines on the substrate perpendicular to and insulated from the gate lines;
disposing a plurality of storage electrodes alternately with the gate lines; and
electrically connecting each of a plurality of pixel electrodes to a data line by a switching element,
wherein the data lines extend in a first direction which is substantially parallel to a direction of the first side, the gate lines extend in a direction substantially perpendicular to the direction of the first side, a number of the gate lines is about half of a number of pixel electrodes in a row of the pixel electrodes extending in the data lines extension direction, and neighboring pixel electrodes in the gate lines extension direction are connected to respective neighboring data lines.

23. The method of manufacturing a liquid crystal display of claim 22, wherein the disposing a plurality of storage electrodes alternately with the gate lines includes each of the storage electrodes disposed substantially adjacent to an edge of a pixel electrode edge of the each pixel electrode and between two gate lines.

* * * * *